US009118951B2

United States Patent
Gandhi et al.

(10) Patent No.: US 9,118,951 B2
(45) Date of Patent: Aug. 25, 2015

(54) TIME-SYNCHRONIZING A PARALLEL FEED OF SECONDARY CONTENT WITH PRIMARY MEDIA CONTENT

(75) Inventors: Bhavan Gandhi, Vernon Hills, IL (US); Benedito J. Fonseca, Jr., Glen Ellyn, IL (US)

(73) Assignee: ARRIS Technology, Inc., Suwanee, GA (US)

( * ) Notice: Subject to any disclaimer, the term of this patent is extended or adjusted under 35 U.S.C. 154(b) by 158 days.

(21) Appl. No.: 13/533,309

(22) Filed: Jun. 26, 2012

(65) Prior Publication Data

US 2013/0346631 A1    Dec. 26, 2013

(51) Int. Cl.
| | | |
|---|---|---|
| *G06F 15/16* | (2006.01) | |
| *H04N 21/41* | (2011.01) | |
| *H04N 21/422* | (2011.01) | |
| *H04N 21/4223* | (2011.01) | |
| *H04N 21/43* | (2011.01) | |
| *H04N 21/439* | (2011.01) | |

(Continued)

(52) U.S. Cl.
CPC ....... *H04N 21/4126* (2013.01); *H04N 21/4223* (2013.01); *H04N 21/42203* (2013.01); *H04N 21/4307* (2013.01); *H04N 21/4394* (2013.01); *H04N 21/44008* (2013.01); *H04N 21/4622* (2013.01); *H04N 21/6581* (2013.01); *H04N 21/8352* (2013.01)

(58) Field of Classification Search
CPC .......................... H04L 9/3247; H04N 21/41407
USPC .................................................. 709/248, 232
See application file for complete search history.

(56) References Cited

U.S. PATENT DOCUMENTS

| | | | |
|---|---|---|---|
| 5,612,729 A | 3/1997 | Ellis et al. | |
| 6,246,803 B1 | 6/2001 | Gauch | |

(Continued)

FOREIGN PATENT DOCUMENTS

| | | |
|---|---|---|
| EP | 1826932 B1 | 2/2006 |
| EP | 2315437 A2 | 4/2011 |

(Continued)

OTHER PUBLICATIONS

IntoNow—Connect with your friends around the shows you love, http://www.intonow.com/ci, downloaded from internet: Jun. 25, 2012, all pages.

(Continued)

*Primary Examiner* — Kevin Bates
*Assistant Examiner* — Clarence D McCray
(74) *Attorney, Agent, or Firm* — Stewart M. Wiener

(57) ABSTRACT

Disclosed is a method of operating a secondary device in a manner associated with operation of a primary device including obtaining first information corresponding to a media asset being output by the primary device, processing the first information to determine local media-signature information, transmitting the first information for receipt by a server, receiving secondary information from the server, wherein the secondary information includes a plurality of asset-media signatures that respectively correspond to respective portions of the media asset, attempting to determine a time-based correlation between at least one portion of the local media-signature information and at least one of the asset-media signatures, and outputting one or more portions of time-relevant asset streams from the secondary device, the one or more portions being determined at least indirectly based upon the correlation.

21 Claims, 7 Drawing Sheets

(51) Int. Cl.
*H04N 21/44* (2011.01)
*H04N 21/462* (2011.01)
*H04N 21/658* (2011.01)
*H04N 21/8352* (2011.01)

(56) References Cited

U.S. PATENT DOCUMENTS

| | | | |
|---|---|---|---|
| 7,650,616 B2 | 1/2010 | Lee | |
| 7,672,843 B2 | 3/2010 | Srinivasan et al. | |
| 7,756,337 B2* | 7/2010 | Chen et al. | 382/187 |
| 7,793,318 B2 | 9/2010 | Deng | |
| 7,885,904 B2 | 2/2011 | Aravamudan et al. | |
| 7,925,590 B2 | 4/2011 | Jain | |
| 7,930,546 B2 | 4/2011 | Rhoads et al. | |
| 7,933,338 B1 | 4/2011 | Choudhry et al. | |
| 7,983,915 B2 | 7/2011 | Knight et al. | |
| 8,832,768 B1* | 9/2014 | Inzerillo | 725/131 |
| 2005/0060640 A1* | 3/2005 | Ross et al. | 715/500.1 |
| 2006/0253894 A1* | 11/2006 | Bookman et al. | 726/2 |
| 2007/0168409 A1 | 7/2007 | Cheung | |
| 2008/0020814 A1* | 1/2008 | Kernene | 463/10 |
| 2008/0187188 A1* | 8/2008 | Beletski et al. | 382/124 |
| 2008/0256354 A1* | 10/2008 | Blumenau | 713/153 |
| 2009/0049465 A1 | 2/2009 | Deng | |
| 2009/0083781 A1 | 3/2009 | Yang et al. | |
| 2009/0265163 A1 | 10/2009 | Li et al. | |
| 2011/0041154 A1 | 2/2011 | Olson | |
| 2011/0099069 A1* | 4/2011 | Hoelz et al. | 705/14.55 |
| 2011/0289532 A1* | 11/2011 | Yu et al. | 725/38 |
| 2012/0017236 A1* | 1/2012 | Stafford et al. | 725/32 |
| 2012/0089659 A1* | 4/2012 | Halevi et al. | 709/201 |
| 2012/0167140 A1* | 6/2012 | Park et al. | 725/39 |
| 2012/0266187 A1 | 10/2012 | Deng | |
| 2012/0290740 A1 | 11/2012 | Tewari et al. | |
| 2013/0007201 A1* | 1/2013 | Jeffrey et al. | 709/217 |
| 2013/0019258 A1 | 1/2013 | Bhatia et al. | |
| 2013/0080916 A1* | 3/2013 | Lopez et al. | 715/753 |
| 2013/0219178 A1* | 8/2013 | Xiques et al. | 713/168 |
| 2013/0246457 A1* | 9/2013 | Stojancic et al. | 707/769 |
| 2013/0290502 A1* | 10/2013 | Bilobrov et al. | 709/223 |
| 2014/0040189 A1* | 2/2014 | Cuttner | 707/610 |
| 2014/0344908 A1* | 11/2014 | Rizzo et al. | 726/6 |

FOREIGN PATENT DOCUMENTS

| | | | |
|---|---|---|---|
| WO | 0211123 | A2 | 2/2002 |
| WO | 03091899 | A2 | 11/2003 |

OTHER PUBLICATIONS

SoundHound—Instant music search and discovery, http://www.soundhound.com, downloaded from internet: Jun. 25, 2012, all pages.

Ellis, Daniel P.W. et al.: "Echoprint—An Open Music Identifiecation Service", http://ismir2011.ismir.net/latebreaking/LB-7.p, 2011 International Society for Music Information Retrieval, all pages.

Avery Li-Chun Wang: "An Industrial-Strength Audio Search Algorithm", Proc. 2003 ISMIR International Symposium on Music Information Retrieval, Baltimore, MD, Oct. 2003, http://www.ee.columbia.edu/~dpwe/papers/Wang03-shazam.pdf, all pages.

Haitsma, Jaap et al.: "A Highly Robust Audio Fingerprinting System", 2002 IRCAM—Centre Pompidou, all pages.

Chandrasekhar, Vijay et al.: "Survey and Evaluation of Audio Fingerprinting Schemes for Mobile Query-By-Example Applications", Proceedings of ISMIR, 2011—cs.toronto.edu, all pages.

Lawler, Ryan: "Flingo is about to make your smart TV even smarter", http://gigaom.com/video/flingo-launch/, down loaded from internet: Jun. 26, 2011, Jul. 7, 2011, all pages.

Bergman, Cory: "CES: Yahoo Connected TV Knows what you're watching", posted: Jan. 6, 2011, http://www.lostremote.com/2011/01/06/yahoo-connected-to-knows-what . . . , downloaded from internet: Oct. 10, 2011, all pages.

Dachman, Jason: "New Civolution App Links TV With Tablet or Mobile Device", Apr. 13, 2011, http://sportsvideo.org/main/blog/2011/04/13/new-civolution-app-links-tv . . . , downloaded form internet: Oct. 11, 2011, all pages.

Zeitera—Video to Video Identification System, http://zeitera.com/press.php, Press Overview, downloaded from internet: Oct. 10, 2011, all pages.

Mihailo Stojancic, "Audio-Video Content Fingerprinting for Smart TV and Synchronous Mobile Content Identification", Jun. 28, 2011, 2011 Zeitera, LLC, www.zeitera.com, all pages.

PCT International Preliminary Report on Patentability and Written Opinion, Re: Application No. PCT/US2013/047815, dated Jan. 8, 2015.

C. Howson, et al., "Second Screen TV Synchronization", 2011 IEEE International Conference on Consumer Electronics, Sep. 8, 2011, pp. 361-365.

PCT International Search Report, Re: Application No. PCT/US2013/047815, dated Dec. 4, 2013.

* cited by examiner

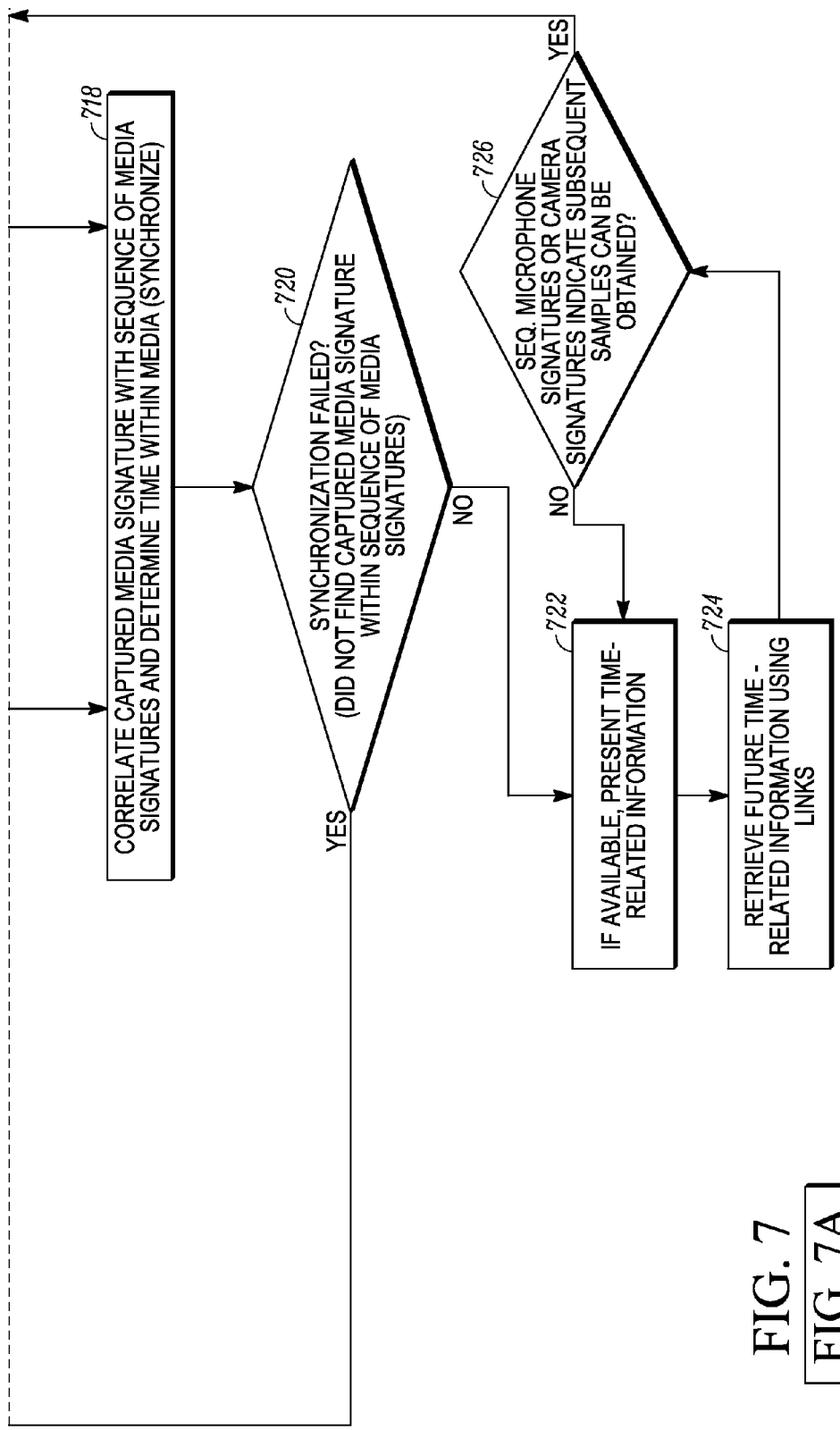

TIME-SYNCHRONIZING A PARALLEL FEED OF SECONDARY CONTENT WITH PRIMARY MEDIA CONTENT

FIELD OF THE INVENTION

The present invention is related generally to synchronization and, more particularly, to time synchronization of a secondary device with media content.

BACKGROUND OF THE INVENTION

To provide an enhanced overall viewing experience for a user of a mobile device, viewers of media content (e.g., television programs) on a display device may wish to access additional information about the media content they are viewing. Absent direct communication between the mobile device and the display device, the mobile device needs to be synchronized with the media content on the display device in order to provide accurate time-dependent information.

BRIEF SUMMARY

The above considerations, and others, are addressed by the present invention, which can be understood by referring to the specification, drawings, and claims. According to aspects of the present invention, a method of operating a secondary device in a manner associated with operation of a primary device is provided that includes obtaining first information corresponding to a media asset being output by the primary device, processing the first information to determine local media-signature information, transmitting the first information for receipt by a server, receiving secondary information from the server, wherein the secondary information includes a plurality of asset-media signatures that correspond to respective portions of the media asset, attempting to determine a time-based correlation between at least one portion of the local media-signature information and at least one of the asset-media signatures, and outputting one or more portions of time-relevant asset streams from the secondary device, the one or more portions being determined at least indirectly based upon the correlation.

According to other aspects of the present invention, a method of synchronizing secondary content presented on a mobile device with primary content viewable on a primary device is provided that includes obtaining first information corresponding to a media asset being output by a primary device, processing the first information to determine local media-signature information, transmitting the first information for receipt by a server, receiving secondary information from the server, wherein the secondary information includes a plurality of asset-media signatures that respectively correspond to respective portions of the media asset, attempting to determine a time-based correlation between at least one portion of the local media-signature information and at least one of the asset-media signatures, and outputting one or more portions of time-relevant asset streams from the secondary device, the one or more portions being determined at least indirectly based upon the correlation.

According to additional aspects of the present invention, a method of synchronizing secondary content presented on a mobile device with primary content viewable on a primary device is provided that includes periodically capturing at least one of a video sample and an audio sample using one or more input devices of a mobile device, wherein the at least one of a video sample and an audio sample is taken from a primary device that outputs a media asset generating local media signatures from a local media-signature generator on the mobile device receiving one or more asset-media signatures related to the media asset, where the asset-media signatures substantially span the time length of the media asset storing the one or more asset-media signatures on the mobile device, correlating the local media signatures against the asset-media signatures, establishing a time reference based on a match between the local media signatures and the asset-media signatures, and periodically updating the time reference.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIGS. 7a and 7b together form a flowchart of an exemplary method for time synchronizing a parallel feed of asset streams with a media asset, which can be performed by one more components of the communication system 100 of FIG. 1.

DETAILED DESCRIPTION

Figure 1:
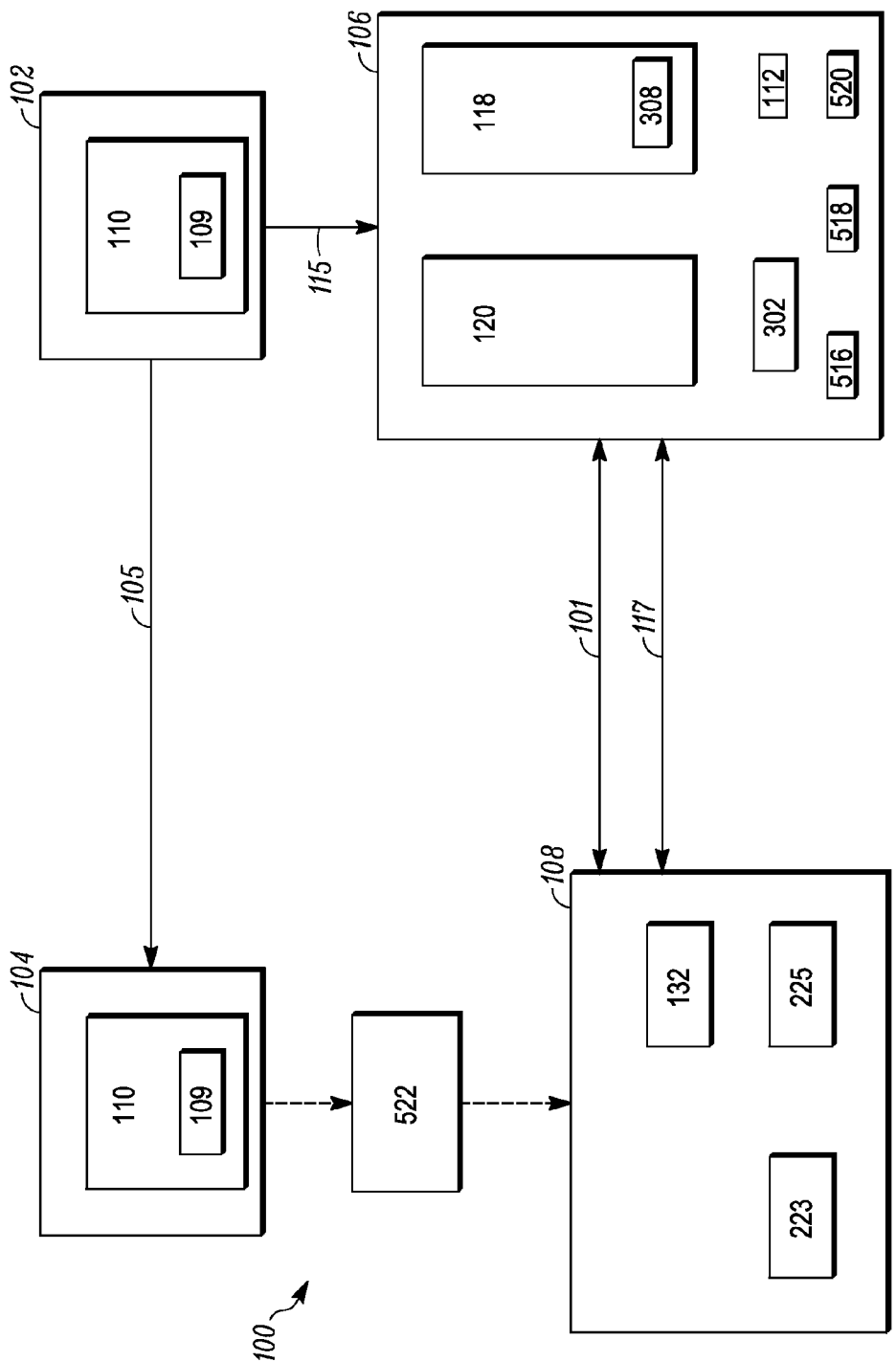
FIG. 1 is a block diagram of an exemplary communication system in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, an exemplary communication system 100 is provided. In at least some embodiments, the communication system 100 is configured to provide a method for time synchronizing a parallel feed 101 of related assets with a stream of primary media content. The communication system 100 includes a media source 102, a primary device 104, a server device 106, and a secondary device, such as a mobile device 108. The exemplary media source 102 can include one or more of various sources of primary media content 110, such as cable television channels, satellite television channels, Internet video feeds, etc. The media source 102 communicates primary media content 110 from various sources, such as television stations, Internet websites, etc. The primary media content 110 includes one or more media assets 109 (e.g., media programs). The media source 102 communicates the primary media content 110 via one or more communication links, such as communication link 105, to one or more primary devices 104, such as a set-top box, for viewing on a television. In addition, the media assets 109 can include live (linear) or recorded (non-linear) primary media content 110, which can be available publicly or privately.

The server 106 is configured to at least one of receive and generate media-asset information 112 that is related to the media assets 109. The media-asset information 112 can include links or pointers to time-related information, such as time-relevant asset streams 312 (see FIG. 3), sequences of asset-media signatures 111, which can include sequences of microphone signatures, and sequences of camera signatures. The media source 102 can communicate the media-asset information 112 to the server 106 via one or more communication links, such as communication link 115. In at least some embodiments, the primary media content 110 is communicated to the server 106, and the server 106 utilizes the primary media content 110 to generate the media-asset information 112. In at least some other embodiments, the media-asset information 112 can be derived at, or obtained by, a second server (not shown) and communicated to the server 106. The server can utilize one or more communication links, such as communication link 117, to communicate with the mobile device 108.

The server 106 includes a memory portion 118, a processor portion 120 in communication with the memory portion 118, and one or more input/output interfaces (not shown) for interfacing the communication links 115, 117 with the processor portion 120. The processor portion 120 can communicate with the media source 102 via the communication link 115 and with the mobile device 108 via the communication link 117. Communication between components in the communication system 100 can include both wired and wireless technologies. Although some exemplary communication links are illustrated in FIG. 1, various other communication links that are not shown can be provided. The memory portion 118 can include various types of storage media, such as Random-Access Memory, Read-Only Memory, hard drives, disc drives, etc., which are capable of storing information such as the media-asset information 112 and assisting with execution of the necessary functions of the server 106. In addition, the memory portion 118 includes an asset-signature database 308 (see FIG. 3).

Figure 2:
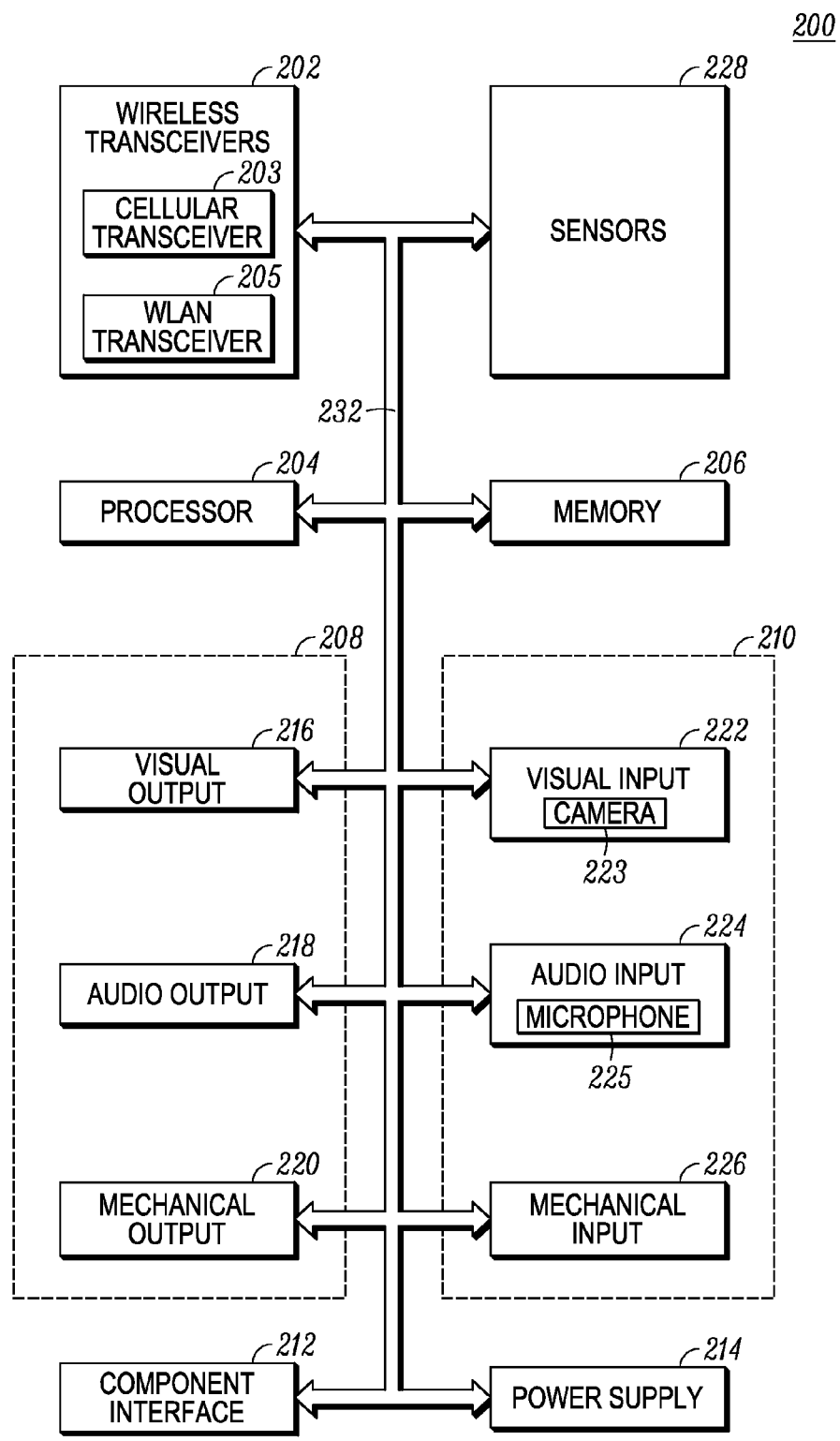
FIG. 2 is a block diagram showing exemplary internal hardware components of a secondary device of FIG. 1.

FIG. 2 illustrates exemplary internal components 200 of a mobile device, such as the mobile device 108, in accordance with the present embodiment. As shown in FIG. 2, the components 200 include one or more wireless transceivers 202, a processor portion 204 (e.g., a microprocessor, microcomputer, application-specific integrated circuit, etc.), a memory portion 206, one or more output devices 208, and one or more input devices 210. In at least some embodiments, a user interface is present that comprises one or more output devices 208, such as a display, and one or more input devices 210, such as a keypad or touch sensor. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 108 to be portable. All of the internal components 200 can be coupled to one another, and in communication with one another, by way of one or more internal communication links 232 (e.g., an internal bus).

In the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, etc., vis-à-vis cell towers (not shown), albeit in other embodiments, the cellular transceiver 203 can be configured instead or additionally to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 205 is a wireless local area network transceiver 205 configured to conduct Wi-Fi communications in accordance with the IEEE 802.11(a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Thus, although in the present embodiment the mobile device 108 has two of the wireless transceivers 203 and 205, the present disclosure is intended to encompass numerous embodiments in which any arbitrary number of wireless transceivers employing any arbitrary number of communication technologies are present.

Exemplary operation of the wireless transceivers 202 in conjunction with others of the internal components 200 of the mobile device 108 can take a variety of forms and can include, for example, operation in which, upon reception of wireless signals, the internal components detect communication signals, and the transceiver 202 demodulates the communication signals to recover incoming information, such as voice or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceivers 202 convey the modulated signals by way of wireless and (possibly wired as well) communication links to other devices such as the server 106 and one or more of the content provider websites (as well as possibly to other devices such as a cell tower, access point, another server, or any of a variety of remote devices).

Depending upon the embodiment, the input and output devices 208, 210 of the internal components 200 can include a variety of visual, audio, or mechanical outputs. For example, the output devices 208 can include one or more visual-output devices 216 such as a liquid-crystal display and light-emitting diode indicator, one or more audio-output devices 218 such as a speaker, alarm, or buzzer, or one or more mechanical-output devices 220 such as a vibrating mechanism. The visual-output devices 216 can include, among other things, a video screen. Likewise, by example, the input devices 210 can include one or more visual-input devices 222 such as an optical sensor (for example, a camera 223), one or more audio-input devices 224 such as a microphone 225, and one or more mechanical-input devices 226 such as a flip sensor, keyboard, keypad, selection button, navigation cluster, touch pad, touch screen, capacitive sensor, motion sensor, and switch. Actions that can actuate one or more of the input devices 210 can include not only the physical actuation of buttons or other actuators but can also include, for example, opening the mobile device 108 (if it can take on open or closed positions), unlocking the device 108, moving the device 108 to actuate a motion, moving the device 108 to actuate a location-positioning system, and operating the device 108.

As shown in FIG. 2, the internal components 200 of the mobile device 108 also can include one or more of various types of sensors 228. The sensors 228 can include, for example, proximity sensors (a light-detecting sensor, an ultrasound transceiver, or an infrared transceiver), touch sensors, altitude sensors, a location circuit that can include, for example, a Global Positioning System receiver, a triangulation receiver, an accelerometer, a tilt sensor, a gyroscope, or any other information-collecting device that can identify a current location or user-device interface (carry mode) of the mobile device 108. Although the sensors 228 are for the purposes of FIG. 2 considered to be distinct from the input devices 210, in other embodiments it is possible that one or more of the input devices 210 can also be considered to constitute one or more of the sensors 228 (and vice-versa). Additionally, even though in the present embodiment the input devices 210 are shown to be distinct from the output devices 208, it should be recognized that in some embodiments one or more devices serve both as input devices 210 and output device 208. For example, in embodiments where a touch screen is employed, the touch screen can be considered to constitute both a visual-output device 216 and a mechanical-input device 226.

The memory portion 206 of the internal components 200 can encompass one or more memory devices of any of a variety of forms (e.g., read-only memory, random-access memory, static random-access memory, dynamic random-access memory, etc.) and can be used by the processor 204 to store and retrieve data. In some embodiments, the memory portion 206 can be integrated with the processor portion 204 in a single device (e.g., a processing device including memory or processor-in-memory), albeit such a single device will still typically have distinct sections that perform the different processing and memory functions and that can be considered separate devices.

The data that are stored by the memory portion 206 can include, but need not be limited to, operating systems, applications, and informational data, such as a database. Each operating system includes executable code that controls basic functions of the communication device 108, such as interaction among the various components included among the internal components 200, communication with external devices via the wireless transceivers 202 or the component interface 212, and storage and retrieval of applications and data to and from the memory portion 206. In addition, the mobile device 108 can include one or more applications. Each application can include executable code that utilizes the operating system to provide more specific functionality for the communication device 108, such as file system service and the handling of protected and unprotected data stored in the memory portion 206. Informational data are non-executable code or information that can be referenced or manipulated by an operating system or application for performing functions of the communication device 108. One such application is the client application 132, as shown in FIG. 1, which is provided for performing the methods described herein.

The client application 132 is intended to be representative of any of a variety of client applications that can perform the same or similar functions on any of various types of mobile devices, such as mobile phones, tablets, laptops, etc. The client application 132 is a software-based application that operates on the processor portion 204 and is particularly configured to provide an interface between the mobile device 108 and one or more others of the components of the communication system 100. In addition, the client application 132 governs operation of one or more of the input and output devices 210, 208, such as the camera 223 and the microphone 225. Further, the client application 132 works in conjunction with a visual interface (e.g., display screen) (not shown) that allows a user of the mobile device 108 to initiate various actions, such as a request for obtaining media-asset information 112 on the mobile device 108 (as discussed in further detail with reference to FIGS. 5 and 6). The client application 132 can take numerous forms and, depending on the embodiment, can be configured to operate on, and communicate with, various operating systems and devices. It is to be understood that various processes described herein as performed by the mobile device 108 can be performed in accordance with operation of the client application 132 in particular or with other applications, depending on the embodiment.

Figure 3:
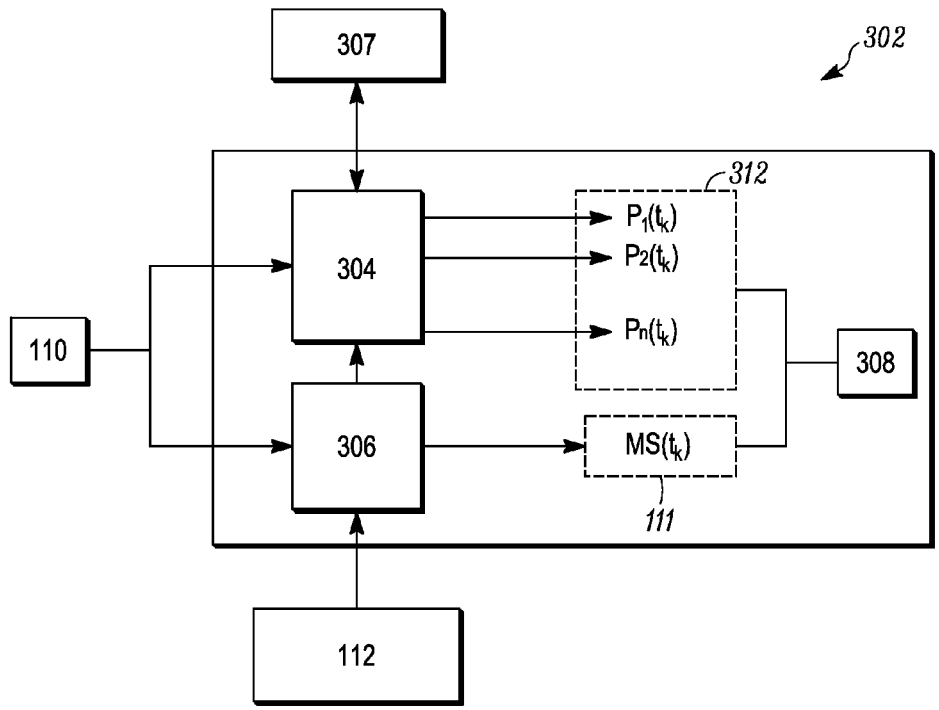
FIG. 3 is a block diagram of an exemplary server that includes a parallel asset-stream generator extracting and storing media-asset information.

Referring now to FIG. 3, the server 106 includes a parallel asset stream generator 302 having a plurality of modules that are capable of receiving the primary media content 110 (audio, video, textual information) (e.g., MPEG-2 TS), extracting media-asset information 112, and storing the media-asset information 112. These modules provide information that is then utilized by additional modules included on the server 106. More particularly, the parallel asset stream generator 302 includes an asset association module 304, a media asset signature generator 306, an editing interface 307, and an asset-signature database 308. The media asset signature generator 306 is configured to receive media content 110 and media-asset information 112. The media asset signature generator 306 generates the asset-media signatures 111 (e.g., ms(tk)) that cover the time span of the media asset 109. The asset-media signatures 111 can include video or audio signatures for one or more media assets 109. The asset association module 304 creates sets of time-relevant asset streams 312 (e.g., p1(tk) . . . pn(tk)). The time-relevant asset streams 312 can be manually entered or edited via the editing interface 307. In addition, the time-relevant asset streams 312 can be prioritized. As the asset-media signatures 111 and the time-relevant asset streams 312 are generated, they are stored in the asset-signature database 308 for use by other modules in the server 106, as discussed below.

Figure 4:
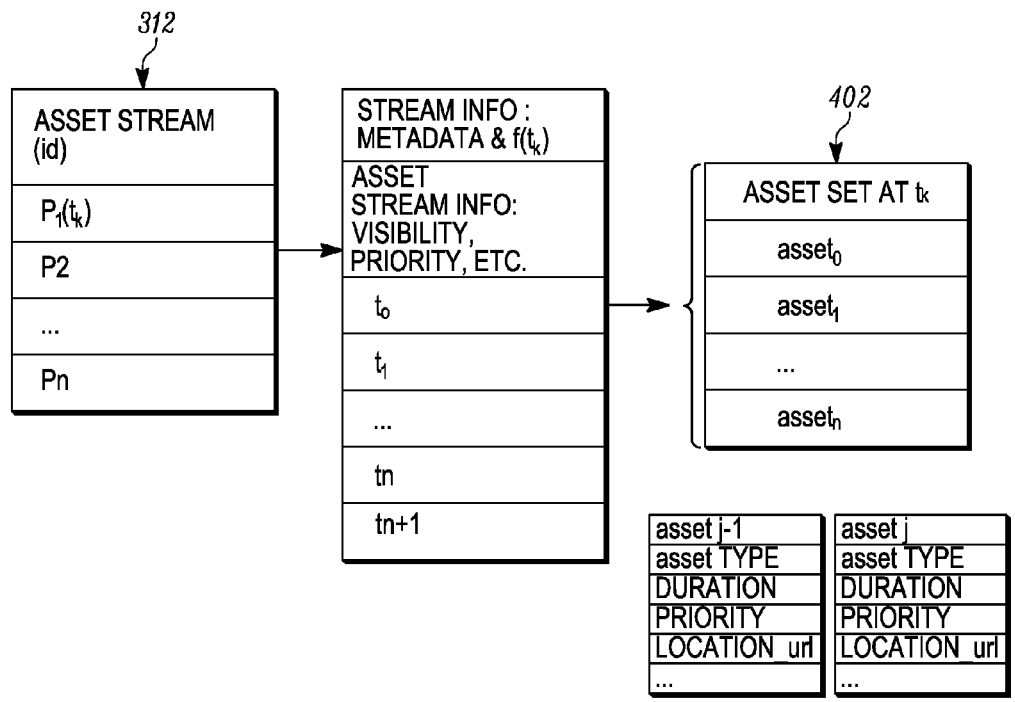
FIG. 4 is a schematic representation of asset information.

FIG. 4 is an exemplary representation of time-relevant asset streams 312. The asset stream 312 identified by an ID, which binds it to the identifier of the primary media content 110. This allows for mapping between the primary media content 110 and the corresponding asset streams 312. In the general case, there could be one or more corresponding asset streams 312. Each asset stream 312 is a function of time and can be identified as asset stream pi(tk), In this case, it is the relative time offset from the primary media content 312 being consumed. There exists general stream information that talks to the visibility and priority of a specific asset stream pi(tk). At each time instant tk, a relevant Asset Set 402 (set of media assets) is exposed. Each media asset 109 within an Asset Set 402 has information about the media asset 109, such as the type of the media asset 109 (e.g., image, video, music, or document) identified by assetType, duration of the media asset 109, or the priority or relative importance of the media asset 109. Additionally, it also contains information about where a specific media asset 109 may be retrieved (e.g., location_url). This exemplary representation of the asset stream 312 allows for the media-asset information 112 to be bound with the primary media content 110 in a time-relevant manner.

Figure 5:
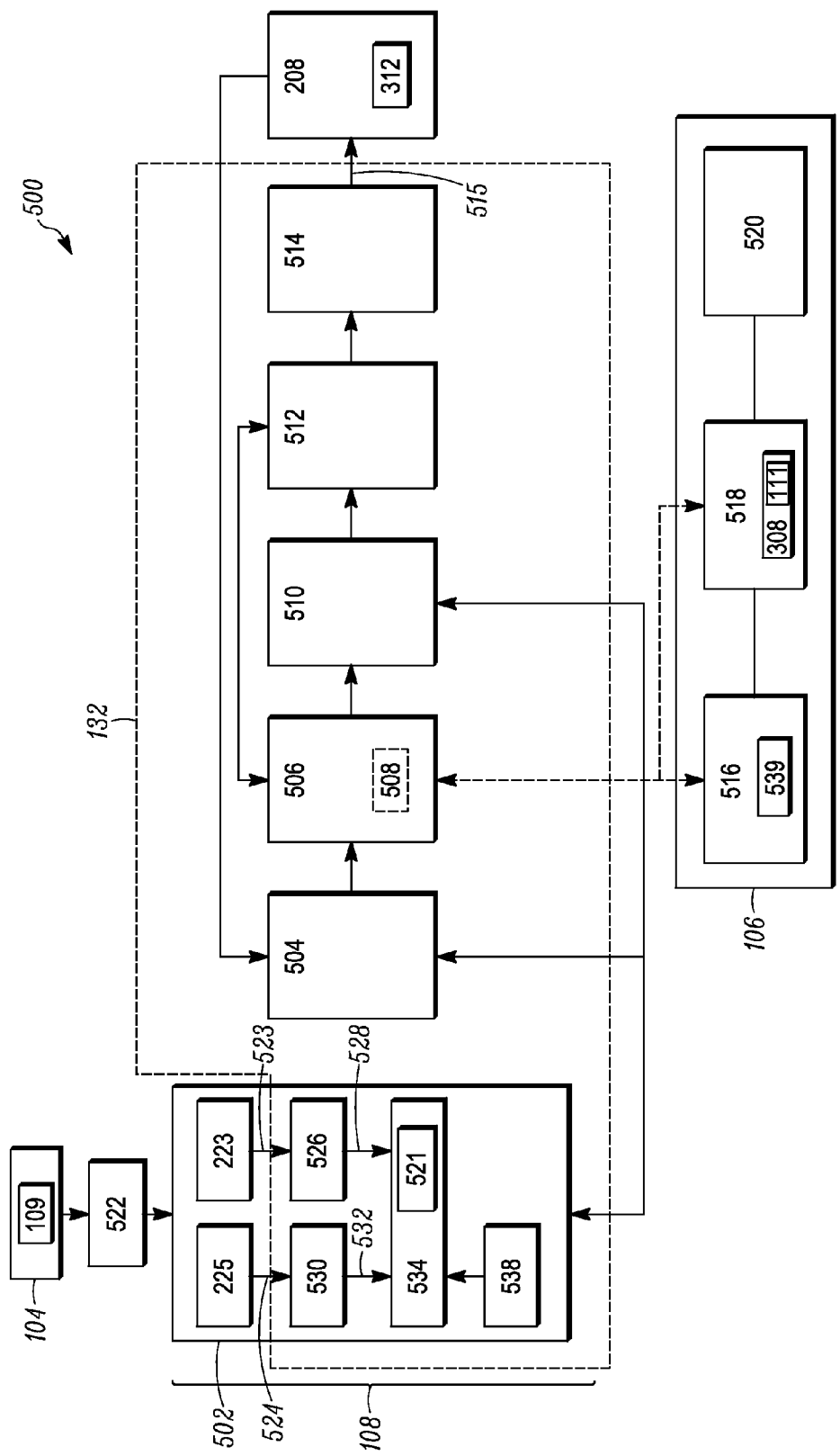
FIG. 5 is block diagram that further illustrates the components of the communication system 100 of FIG. 1.

FIG. 5 provides a further illustration 500 of the components of the communication system 100 of FIG. 1 and inter-relationships therebetween. More particularly, various aspects of the client application 132 of the mobile device 108 are shown interacting with the primary device 104, the server 106, and other portions of the mobile device 108. As shown, the client application 132 can include a local media-signature generator 502, a parallel feed client controller 504, a client caching module 506 (that is in communication with a client caching database 508), a time synchronizer 510, a stream selector module 512, and a parallel feed consumer module 514. In addition, the server 106 can include one or more applications with various modules, namely, a media lookup service module 516, a parallel feed service module 518, and an EPG service module 520. One or more of these components can be in communication with the asset parallel asset stream generator 302, as discussed above with reference to FIG. 3. In particular, the parallel feed service module 518 is in communication with the asset-signature database 308.

The local media-signature generator 502 is utilized by the mobile device 108 and by the client application 132 to generate one or more local media signatures 521 from one or more local media samples 522. The local media sample 522 is obtained from the primary media content 110, in particular the media assets 109, viewed on the primary device 104 by a user of the secondary device 108. The local media sample 522 can include a video or audio sample obtained with one or more input devices 210 of the mobile device 108. In at least some embodiments, the user can utilize the camera 223 to obtain a raw video sample 523 of a media asset 109 (program) displayed on the primary device 104. Alternatively, or additionally, the user can utilize the microphone 225 to obtain a raw audio sample 524 of the media asset 109. The raw video sample 523 is processed using a video signature processor 526. The video signature processor 526 is configured to analyze the raw video sample 523 and to identify distinguishing local video features 528. Likewise, the raw audio sample 524 is processed using an audio signature processor 530, the audio signature processor 530 being configured to analyze the raw audio sample 524 and to identify distinguishing local audio features 532. The local media-signature generator 502 further includes a local signature builder 534 configured to collect the local video features 528 and the local audio features 532 and to build one or more local media signatures 521. In addition, a media-signature collection controller 538 is provided to control the local signature builder 534 and at least indirectly, the acquisition and processing of the local media samples 522.

Once the local media-signature generator 502 has generated at least one local media signature 521, the local media signature 521 is communicated to the server 106, where it is received by the media lookup service module 516. The media lookup service module 516 correlates the local media signature 521 over a finite time window ms'[tn,tm] and finds the media asset ID 539 as well as the point in time at which the local media signature 521 appears in the time span of the media asset 109. The parallel feed service module 518 then sends the media asset ID 539 along with the associated media-asset information 112, the relevant asset-media signatures 111, and the time-relevant asset streams 312 to the client caching module 506 on the mobile device 108 for storage on the client caching database 508.

The parallel feed client controller 504 controls the timely presentation of the time-relevant asset streams 312. The time synchronizer 510 ensures that the parallel feed client controller 504 is maintaining the correct timing for presentation of the time-relevant asset streams 312 relative to the media asset 109 being viewed by the user. To maintain correct timing, the time synchronizer 510 periodically receives a finite time windowed local media signature 521 from the local media-signature generator 502 and correlates it against the asset-media signatures 111 received from the parallel feed service module 518, where the asset-media signatures 111 span the entire time length of the media asset 109. If the local media signature 521 is matched with an asset-media signature 111, then the parallel feed client controller 504 can adjust an internal time reference, if necessary, to match the time associated with the asset-media signature 111. During the matching process, the time synchronizer 510 first attempts to match the local media signature 521 against the stored asset-media signature 111 at time points near the latest synchronization time point. If the matching fails near the latest synchronization time point, a condition that can occur if the user fast-forwards, rewinds, pauses, or jumps to another point in the media stream, then the time synchronizer 510 attempts to match the local media signature 521 against the remaining time points of the stored asset-media signature 111. If the local media signature 521 cannot be matched with asset-media signature 111 at any time point, then the parallel feed client controller 504 is alerted to a fault condition or a channel change by the user that has changed the assumed media asset 109 to a new unknown media asset 109. The stream selector module 512 communicates with the client caching module 506 to identify which asset stream 312 is to be communicated to the parallel feed consumer module 514. The parallel feed consumer module 514 communicates the asset stream 312 selected by the stream selector module 512 to one or more outputs 208 of the secondary device 108 via a parallel feed link 515.

Figure 6:
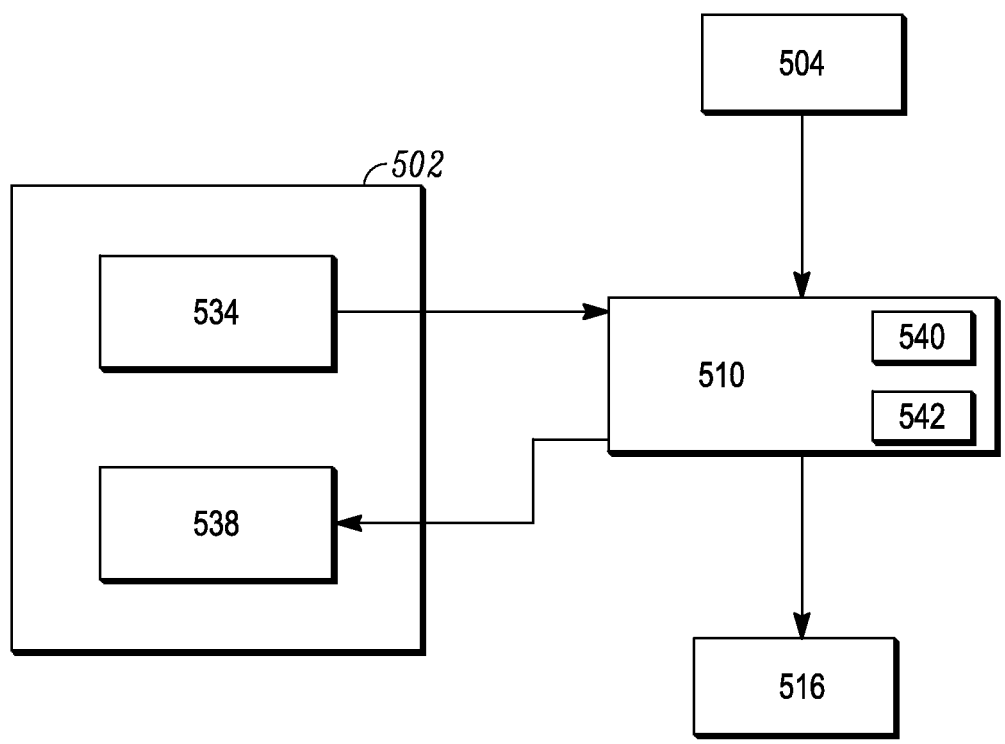
FIG. 6 is a block diagram of various components of FIG. 5.

FIG. 6 provides a block diagram of the client application 132 of FIG. 5. In particular, the local media-signature generator 502, the parallel feed client controller 504, the media lookup service module 516, and the time synchronizer 510 are shown. To provide a parallel feed from the server 106 to the mobile device 108, the parallel feed client controller 504 is instructed to initialize the time synchronizer 510. The time synchronizer 510 communicates a request to the media-signature generator 502 to provide one or more local media signatures 521 that include both local audio features 532 and local video features 528. During this initialization step, the media signatures 521 are taken at a continuous collection interval 540 and sent to the media lookup service 516 (as discussed above) to obtain the media asset ID 539.

After the media asset 110 has been identified and the parallel feed 101 has started to communicate media-asset information 112, asset-media signatures 111, and time-relevant asset streams 312 to the mobile device 108, the time synchronizer 510 requests additional local media signatures 521 that include only the local audio features 532. The time synchronizer 510 communicates a request to the media-signature generator 502 to provide local media signatures 521 during specific (non-continuous) collection intervals 542 (ci1, ..., cin), where the local media signatures 521 include only the local audio features 532. By limiting the local media signatures 521 to only local audio features 532 and limiting the collection intervals, the processing and bandwidth burden on the mobile device 108 is limited, which can improve battery life and response time. In at least some embodiments, the local media signatures 521 can also include the local video features 528.

The specific collection intervals 542 for collecting the local media signatures 521 are chosen to include the most representative intervals for the currently viewed media asset 109. The specific collection intervals 542 are chosen by either the parallel feed service module 518, by the time synchronizer 510, or by the parallel feed client controller 504. The specific collection intervals 542 are chosen such that they contain salient local audio features 532 that characterize the media asset 109 at each point in time. For instance, if the media asset 109 contains a particular melody or sequence of notes between times T1 and T2, contains silence between times T2 and T3, contains female speech between times T3 and T4, contains another silence interval between times T4 and T5, and a gun shot between times T5 and T6, then the collection intervals 542 would include one or more of the time intervals T1-T2, T3-T4, and T5-T6 and would exclude time intervals T2-T3 and T4-T5 since they are known to not contain salient local audio features 532. Note that the collection intervals 542 can contain a subset of time intervals that contain audio information, including just time intervals with the most salient local audio features 532 in order to further minimize the time periods in which local audio samples 524 are collected by the device 108. In the example provided, the melody in the time interval T1-T2 and the gun shot between T5-T6 can be considered to be more salient local audio features 532 than the time interval T3-T4 containing female speech. At least one of the parallel feed service module 518, via the time synchronizer 510, and the parallel feed client controller 504, that determines the collection intervals 542, contains digital signal processing algorithms that extract local audio features 532 and uses them to categorize each portion of the local media samples 522 from the media asset 109. For instance, algorithms that compute the audio energy contained in a time interval can be used to determine whether the time interval contains mostly silence. For instance, known algorithms that can determine the presence of music in an audio period can be used to determine whether the time interval contains a melody.

The determination of the most salient time intervals can also be done from the media signatures 111 themselves. For instance, some audio media-signature algorithms generate media signatures 111 based on peaks of the spectrogram and on their relation in time. The number of peaks per second and their average amplitude can be considered a measure to determine how salient a time interval is. Collecting the local media signatures 521 that are limited to including local audio features 532 generated only during the most representative intervals, as opposed to continuously, prevents continuous recording of audio at the microphone 225, which can potentially pose privacy concerns to a user. If the most currently analyzed local media signature 521 ceases to match the asset-media signatures 111 for the media asset 109 believed to be viewed by the user, then the time synchronizer 510 requests a complete set of asset-media signatures 111 that can include both the local audio features 532 and the local video features 528 or can include only the local audio features 532, which are taken at a continuous collection interval 540. The current local media signature 521 is then compared to the complete set of asset-media signatures 111. If no match is found, then the complete set of asset-media signatures 111 is sent to the media lookup service module 516 for re-identification, and the parallel feed consumer module 514 suspends sending time-relevant asset streams 312 until a new media asset 109 is identified and synchronized.

Figure 7A:
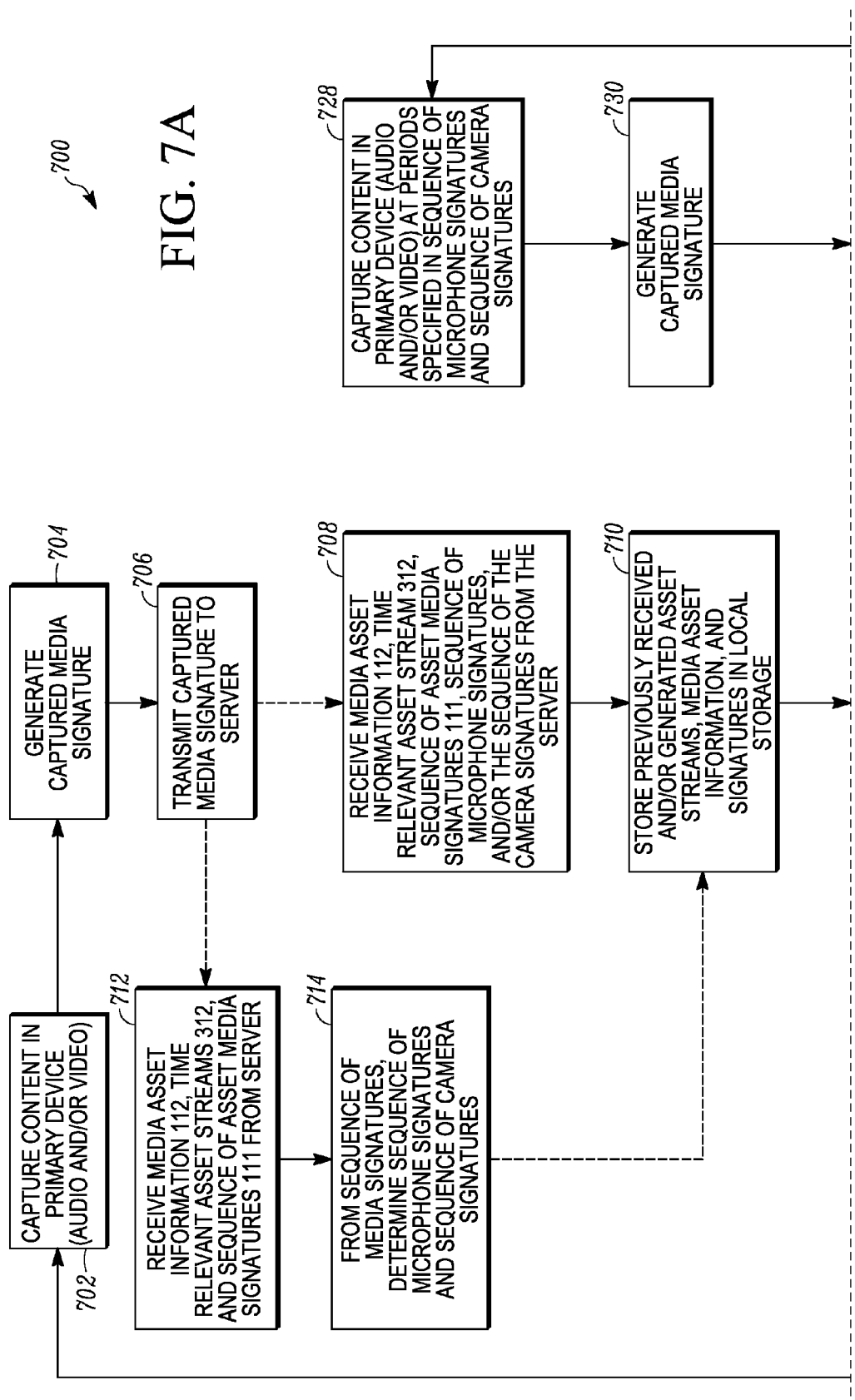

FIGS. 7a and 7b provide a flowchart 700 that shows an exemplary method for time synchronizing a parallel feed of related assets with a stream of primary media content, which can be performed by one more components of the communication system 100 of FIG. 1. More particularly, as shown, the method begins at step 702 in which the mobile device 108 captures the raw video sample 523 or the raw audio sample 524 from the primary media content 110 using the camera 223 or the microphone 225. At a step 704, the local media-signature generator 502 processes the raw video sample 523 or the raw audio sample 524 to form a local media signature 521. The local media signature 521 is then transmitted to the server 106 for analysis in step 706.

In particular, the local media signature 521 is sent to the media lookup service module 516 of the server 106, where the local media signature 521 is compared with asset-media signatures 111 representing various media assets 109. If a match is found to a particular media asset 109, then the media asset ID 539 of the media asset 109 is sent to the parallel feed service module 518. In step 708, the mobile device 108 receives media-asset information 112, time-relevant asset streams 312, a sequence of asset-media signatures 111, a sequence of microphone signatures, and a sequence of camera signatures from the parallel feed service module 518.

In at least one other embodiment, the sequence of microphone signatures and the sequence of camera signatures are not provided to the mobile device 108, as described in step 708. Instead, as shown in step 712 and step 714, which would replace step 708, they are generated at the mobile device 108. More particularly, the media-asset information 112 received in step 712 includes only the time-relevant asset streams 312 and the sequence of asset-media signatures 111. In step 714, the mobile device 108 generates the sequence of microphone signatures and the sequence of camera signatures. In one embodiment, the sequence of microphone signatures is extracted from the asset-media signature 111 through the computation of the number of peaks per second in the spectrogram. The sequence of camera signatures is extracted from the asset-media signature 111 through the computation of the number of scene cuts per second. At the conclusion of step 708 or step 714, the media-asset information 112, the time-relevant asset streams 312, the sequence of asset-media signatures 111, the sequence of microphone signatures, and the sequence of camera signatures are stored in the client caching database 508 on the mobile device 108.

In step 718 of FIG. 7b, the mobile device 108 correlates the local media signature 521 with the sequence of asset-media signatures 111 stored locally to determine the time-instant (point in time) within the media asset 109 that the local media signature 521 corresponds with. The time-instant is used to establish and maintain synchronization between the mobile device 108 and the media asset 109. As explained before, during step 718, the mobile device 108 first attempts to match the local media signature 521 against the stored asset-media signature 111 at the time instances near the latest synchronization time point. If the matching fails near the latest synchronization time point, a condition that can occur if the user fast-forwards, rewinds, pauses, or jumps to another point in the media stream, then the mobile device 108 attempts to match the local media signature 521 against the remaining time points of the stored asset-media signature 111. In step 720, if the local media signature 521 was not found either near the latest synchronization time point nor in any other time point of the asset-media signatures 111 stored locally, then synchronization has failed, and the process returns to step 702, wherein new raw video or raw audio samples 523, 524 are obtained. If synchronization is accomplished in step 718, then the process moves to step 722, where the present time-relevant asset streams 312 corresponding to the computed time-instant can then be presented by an application on the mobile device 108 for view by the user. In step 724, to ready the mobile device 108 for presenting the next set of time-related information, the system can retrieve future time-related information.

As discussed above, one or more sequences of microphone signatures and sequences of camera signatures can also be stored in the device 108. These signatures can include information that indicates the collection intervals 542 and the allowable capture periods within each collection interval 542 when the appropriate capture device (microphone 225 or camera 223) will be activated to capture subsequent raw video samples 523 or raw audio samples 524 from the media asset 109. In step 726, the signatures are analyzed to ascertain if the next collection interval 542 has arrived. If the next collection interval 542 has not arrived yet, then the process returns to step 722, and the synchronized presentation of time-relevant asset streams 312 continues based on a local clock, which started timing upon the last synchronization. If the next collection interval 542 has arrived, then the process moves to step 728, where subsequent audio samples 524 or video samples 523 are obtained from the media asset 109 at periods within the collection interval 524 that are indicated as allowable by the sequences of microphone signatures and by the sequences of camera signatures. In step 730, local media signatures 521 are generated for the samples 523, 524, allowing for updated correlation analysis in step 718 to verify the synchronization between the client application 132 and the playback of the media asset 109.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method of operating a secondary device in a manner associated with operation of a primary device, the method comprising:
   (a) obtaining first information corresponding to a media asset being output by the primary device;
   (b) processing the first information to determine local media-signature information;
   (c) transmitting the first information for receipt by a server;
   (d) receiving secondary information from the server, wherein the secondary information includes a plurality of asset-media signatures that respectively correspond to respective portions of the media asset;
   (e) determining a time-based correlation between at least one portion of the local media-signature information and at least one of the asset-media signatures; and based at least in part upon the plurality of asset-media signatures, further determining whether the media asset is no longer being output by the primary device; and
   (f) outputting one or more portions of time-relevant asset streams from the secondary device, the one or more portions being determined at least indirectly based upon the correlation;
   wherein steps (a), (b), and (e) are each repeated periodically, and wherein each repeated step (e) includes, in the secondary device, comparing the first information with a first subset of the plurality of asset-media signatures, the first subset corresponding to one or more time points close to a latest synchronization time point, to identify a match between the first information and one or more of the first subset of the plurality of asset-media signatures at the one or more time points.

2. The method of claim 1 wherein the secondary information includes one or more of links or pointers to the time-relevant asset streams associated with respective portions of the media asset.

3. The method of claim 2 wherein the one or more portions of the time-relevant asset streams are received by the secondary device as a parallel feed.

4. The method of claim 1 wherein the first information includes at least one audio sample.

5. The method of claim 1 further comprising storing the received secondary information including the plurality of asset-media signatures.

6. The method of claim 5 wherein the secondary device is a mobile device selected from the group consisting of: a cell phone, a personal digital assistant, and a tablet computer device.

7. The method of claim 1 further including during step (e):
   if no match is found, comparing the first information to a second subset of asset-media signatures.

8. The method of claim 1 wherein the obtaining is performed by at least one input device of the secondary device, the at least one input device being selected from the group consisting of: a camera and a microphone.

9. The method of claim 1 wherein the secondary information additionally includes a plurality of data portions respectively identifying respective times at which to perform the obtaining of the first information so as to enhance user privacy and reduce battery consumption.

10. The method of claim 1 wherein an input device of the secondary device is activated so as to result in the obtaining of the first information at during collection intervals identified in the secondary information.

11. The method of claim 1 further comprising determining, based at least in part upon the plurality of asset-media signatures as stored at the secondary device, one or more collection intervals during which to perform the obtaining of the first information.

12. The method of claim 11 wherein an input device of the secondary device is activated so as to result in the obtaining of the first information at the one or more collection intervals.

13. The method of claim 1 wherein the determining step (e) further comprises determining, based at least in part upon the as set-media signatures, at least one of: whether a first media asset being output by the primary device has changed to a second media asset being output by the primary device, and whether a fault has occurred.

14. The method of claim 1 wherein the received secondary information additionally includes at least one of: a first sequence of media signatures, a second sequence of microphone signatures, and a third sequence of camera signatures.

15. The method of claim 1:
   wherein third information is obtained that includes one or more as set-media signatures that include only audio-sample information; and
   wherein the secondary information includes the first sequence of media signatures.

16. The method of claim 1 wherein (a), (b), (c), (d), and (e) are repeated until, and (f) is not performed until, the determining of (e) produces a time correspondence between the at least one portion of the local media signature with the at least one of the asset-media signatures.

17. The method of claim 1 further comprising, following (f):
   retrieving future time-relevant asset streams at times determined from the sequence of microphone or camera signatures to obtain updated asset-media signatures.

18. A mobile device comprising:
   an input device by which first information corresponding to primary content being output by an external device is periodically and repeatedly obtained, the first information including video or audio information;

a processing device coupled at least indirectly to the input device, the processing device configured to periodically and repeatedly develop local media-signature information based at least in part upon the first information;

a wireless transceiver configured to receive communication signals originating at a server, the communication signals including one or more portions of secondary information that includes a plurality of time-relevant asset-media signatures that respectively correspond to respective portions of the primary content; and a memory device configured to store one or more portions of the secondary information;

wherein the processing device is further configured to periodically and repeatedly determine a time-based correlation between at least one portion of the media-signature information and at least one of the time-relevant asset-media signatures, wherein each repeated determining includes, in the mobile device, comparing the first information with a first subset of the plurality of time-relevant asset-media signatures, the first subset corresponding to one or more time points close to a latest synchronization time point, to identify a match between the first information and one or more of the first subset of the plurality of time-relevant asset-media signatures at the one or more time points, and based at least in part upon the plurality of time-relevant asset-media signatures, further determining whether the primary content is no longer being output by the primary device;

the processing device being further coupled at least indirectly to each of the wireless transceiver and the memory device; and an output device by which one or more portions of time-relevant asset streams are output from the mobile device, the one or more portions being determined at least indirectly based upon the correlation.

19. The mobile device of claim 18:

wherein the mobile device is selected from the group consisting of: a cell phone, a personal digital assistant, a mobile computer device, and a tablet computer device; and wherein the input device is selected from the group consisting of: a microphone and a camera.

20. A method of synchronizing secondary content presented on a mobile device with primary content viewable on a primary device, the method comprising:

(a) obtaining first information corresponding to a media asset being output by a primary device;

(b) processing the first information to determine local media-signature information;

(c) transmitting the first information for receipt by a server;

(d) receiving secondary information from the server, wherein the secondary information includes a plurality of asset-media signatures that respectively correspond to respective portions of the media asset;

(e) determining a time-based correlation between at least one portion of the local media-signature information and at least one of the asset-media signatures; and, based at least in part upon the plurality of asset-media signatures, further determining whether the media asset is no longer being output by the primary device; and (f) outputting one or more portions of time-relevant asset streams from the mobile device, the one or more portions being determined at least indirectly based upon the correlation;

wherein steps (a), (b), and (e) are each repeated periodically, and wherein each repeated step (e) includes, in the mobile device, comparing the first information with a first subset of the plurality of asset-media signatures, the first subset corresponding to one or more time points close to a latest synchronization time point, to identify a match between the first information and one or more of the first subset of the plurality of asset-media signatures at the one or more time points.

21. A method of synchronizing secondary content presented on a mobile device with primary content viewable on a primary device, the method comprising:

periodically and repeatedly capturing at least one of a video sample and an audio sample using one or more input devices of a mobile device, wherein the at least one of a video sample and an audio sample is taken from a primary device that outputs a media asset;

generating local media signatures from a local media-signature generator on the mobile device;

receiving one or more asset-media signatures related to the media asset, where the asset-media signatures substantially span the time length of the media asset;

storing the one or more asset-media signatures on the mobile device;

periodically and repeatedly correlating the local media signatures against the asset-media signatures wherein each repeated correlation includes, in the mobile device, comparing one or more of the local media signatures with a first subset of the one or more asset-media signatures, the first subset corresponding to one or more time points close to a latest synchronization time point, to identify a match between the one or more of the local media signatures and one or more of the first subset of the one or more asset-media signatures at the one or more time points;

establishing a time reference based on the match between the local media signatures and the asset-media signatures; and periodically updating the time reference, and based at least in part upon the one or more asset-media signatures, determining whether the primary content is no longer being output by the primary device.

* * * * *